United States Patent
Achterhold et al.

(10) Patent No.: US 11,531,888 B2
(45) Date of Patent: Dec. 20, 2022

(54) METHOD, DEVICE AND COMPUTER PROGRAM FOR CREATING A DEEP NEURAL NETWORK

(71) Applicant: Robert Bosch GmbH, Stuttgart (DE)

(72) Inventors: Jan Achterhold, Tübingen (DE); Jan Mathias Koehler, Stuttgart (DE); Tim Genewein, London (GB)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 16/757,186

(22) PCT Filed: Oct. 15, 2018

(86) PCT No.: PCT/EP2018/077995
§ 371 (c)(1),
(2) Date: Apr. 17, 2020

(87) PCT Pub. No.: WO2019/081241
PCT Pub. Date: May 2, 2019

(65) Prior Publication Data
US 2020/0342315 A1 Oct. 29, 2020

(30) Foreign Application Priority Data
Oct. 23, 2017 (DE) .................. 102017218851.0

(51) Int. Cl.
*G06N 3/08* (2006.01)
*G06N 3/04* (2006.01)
(52) U.S. Cl.
CPC ............ *G06N 3/08* (2013.01); *G06N 3/04* (2013.01); *G06N 3/0472* (2013.01)
(58) Field of Classification Search
CPC ........... G06N 3/08; G06N 3/04; G06N 3/0472
See application file for complete search history.

(56) References Cited

U.S. PATENT DOCUMENTS

| 5,119,469 A | 6/1992 | Alkon et al. |
| 2016/0086078 A1 | 3/2016 | Ji et al. |

(Continued)

FOREIGN PATENT DOCUMENTS

| JP | H10191091 A | 7/1998 |
| WO | 2017170799 A1 | 10/2017 |

OTHER PUBLICATIONS

Doshi et al., "Deep Learning Neural Networks Optimization using Hardware Cost Penalty", May 2016, 2016 IEEE International Symposium on Circuits and Systems (ISCAS), pp. 1954-1957. (Year: 2016).*

(Continued)

*Primary Examiner* — Ying Yu Chen
(74) *Attorney, Agent, or Firm* — Norton Rose Fulbright US LLP; Gerard Messina

(57) ABSTRACT

A method for creating a deep neural network. The deep neural network includes a plurality of layers and connections having weights, and the weights in the created deep neural network are able to assume only predefinable discrete values from a predefinable list of discrete values. The method includes: providing at least one training input variable for the deep neural network; ascertaining a variable characterizing a cost function, which includes a first variable, which characterizes a deviation of an output variable of the deep neural network ascertained as a function of the provided training input variable relative to a predefinable setpoint output variable, and the variable characterizing the cost function further including at least one penalization variable, which characterizes a deviation of a value of one of the weights from at least one of at least two of the predefinable discrete values; training the deep neural network.

14 Claims, 4 Drawing Sheets

(56) References Cited

U.S. PATENT DOCUMENTS

| | | | | |
|---|---|---|---|---|
| 2016/0328646 | A1* | 11/2016 | Lin | G06V 10/454 |
| 2017/0083772 | A1* | 3/2017 | Kim | G06K 9/6223 |
| 2017/0140247 | A1* | 5/2017 | Yoo | G06K 9/6256 |
| 2018/0074493 | A1* | 3/2018 | Prokhorov | B60W 30/00 |
| 2020/0342315 | A1* | 10/2020 | Achterhold | G06N 3/08 |

OTHER PUBLICATIONS

Li et al., "Ternary weight networks", Nov. 19, 2016, arXiv:1605.04711v2, pp. 1-5. (Year: 2016).*

Kingma et al., "Variational Dropout and the Local Reparameterization Trick", Dec. 20, 2015, arXiv:1506.02557v2, pp. 1-14. (Year: 2015).*

Li et al., "Dropout Inference in Bayesian Neural Networks with Alpha-divergences", Mar. 8, 2017, pp. 1-13. (Year: 2017).*

International Search Report for PCT/EP2018/077995, dated Jan. 22, 2019.

BPatG17W(pat) 6/06, Sep. 3, 2010, (Federal Patent Court Decision in the Complaint Regarding Patent Application 19626775.7-53).

Achille, Alessandro, et al.,"Information Dropout: Learning Optimal Representations Through Noisy Computation", in: Computing Research Repository (CORR), 2017, pp. 1-11. htpps://arxiv.org/abs/1611.01353v3.

Gal, Varin, et al., "Concrete Dropout", in: Computing Research Repository (CORR), 2017, pp. 1-14. https://arxiv.org/abs/1705.07832v1.

Ullrich, Karen, et al., "Soft Weight Sharing for Neural Network Compression", in: Computing Research Repository (CORR), 2017, pp. 1-16. https://arxiv.org/abs/1702.04008v2.

Neklyudov, Kirill, et al., "Structured Bayesian Pruning via Log-Normal Multiplicative Noise", in: Computing Research Repository (CORR), 2017, pp. 1-14. https://arxiv.org/abs/1705.07283v1.

Louizos, Christos, et al., "Bayesian Compression for Deep Learning", in: Computing Research Repository (CORR), 2017, pp. 1-17. https://arxiv.org/abs/1705.08665v3.

Alex Graves, "Practical Variational Inference for Neural Networks", Advances in Neural Information Processing Systems 24 : 25th Annual Conference on Neural Information Processing Systems 2011, Granada, Spain, Red Hook, NY, 2011, pp. 1-9. XP055500609 https://papers.nips.cc/paper/4329-practical-variational-inference-for-neural-networks.pdf.

Miguela Carreira-Perpinan, et al., "Model Compression as Constrained Optimization, With Application to Neural Nets. Part II: Quantization", arxiv.org, Cornell University Library, 201 Olin Library Cornell University Ithaca, NY 14853, 2017, pp. 1-33, XP080776639.

Darryl D Lin, et al., "Fixed Point Quantization of Deep Convolutional Networks", 2015, pp. 1-10. XP055284812 https://arxiv.org/pdf/1511.06393v3.pdf.

* cited by examiner

US 11,531,888 B2

METHOD, DEVICE AND COMPUTER PROGRAM FOR CREATING A DEEP NEURAL NETWORK

FIELD

The present invention relates to a method for creating a deep neural network, to a computer program and to a device, each of which is configured to carry out the method.

BACKGROUND INFORMATION

U.S. Pat. No. 5,119,469 describes a neural network system including a plurality of synapses and an adaptive weight circuit for adjusting the weights of each synapse. The neural network system is successively trained for pattern recognition using a series of training data by systematically adjusting the weights.

SUMMARY

An example method in accordance with the present invention may have the advantage over the related art that the weights of the connections of the deep neural network are ascertained in such a way that the weights assume a predefinable discrete value from a list including discrete values. With the discrete values of the weights of the created deep neuronal network, it is possible to achieve a reduction of the required memory space for storing the deep neural network, because the weights may, for example, be stored on the basis of an index of the discrete value from the list. As a result, it is no longer necessary to store each value of a weight individually with a high degree of accuracy, rather it is sufficient if in each case only one index of the value of the weight and the predefinable list including discrete values and their indices are stored. This means that the created deep neural network has a lower memory space requirement. A compression of the representation of the deep neural network is also achieved with the aid of the example method, because the values of the weights of the created deep neural network are no longer continuous, rather the weights may only assume a certain number of predefinable discrete values. This means that the deep neural network is characterized by a smaller number of different weights and a compressed representation may be achieved. A further advantage of the method is that with the discrete values of the weights, it is possible using the distributive law to reduce the number of mathematical operations, in particular, multiplications, required to be carried out in order to ascertain an output variable of the deep neural network. Since the values of the weights may assume only predefinable different discrete values, it is possible with the aid of the distributive law to factor out the weights that have the same discrete value, as a result of which the number of multiplications and the computing time for ascertaining the result may be significantly reduced.

In a first aspect, the present invention provides an example method for creating a deep neural network. The deep neural network includes a plurality of layers and connections including weights. The weights in the created deep neural network may assume only predefinable discrete values from a predefinable list of discrete values. The example method includes the following steps:

providing at least one training input variable for the deep neural network,
ascertaining a variable characterizing a cost function. The variable characterizing the cost function includes in this case a first variable, which characterizes a deviation of an output variable of the deep neural network ascertained as a function of the provided training input variable relative to a predefinable setpoint output variable. The variable characterizing the cost function further includes at least one penalization variable, which characterizes a deviation of a value of one of the weights from at least one of at least two of the predefinable discrete values,
training the deep neural network in such a way that the deep neural network detects an object as a function of the training input variable of the deep neural network. During the training of the deep neural network, at least one value of one of the weights is adapted as a function of the variable characterizing the cost function,
mapping the values of the weights on one discrete value each contained in the predefinable list. The advantage of this method is that the generated deep neural network may be stored in a compressed manner based on the discrete values of the weights and that the mathematical operations for ascertaining the output variable of the deep neural network may be efficiently carried out.

The predefinable list of discrete values may be a list of a plurality of predefinable discrete values, each entry of the list being assigned an index. A mapping of the values on one discrete value each is understood to mean that a value from the predefinable list of discrete values is assigned to every weight as a function of its value and of the predefinable discrete values of the predefinable list. If, for example, the value of one of the weights is within a predefinable tolerance range by one of the at least two predefinable discrete values, that predefinable discrete value within whose tolerance range the value of the weight is situated, is assigned as the value of this weight, in particular, stored as the value associated with this weight. The tolerance ranges of the respective at least two predefinable discrete values preferably do not overlap. A selection mechanism would otherwise optionally have to be provided, which selects the admissible discrete value that may be assigned to the weight based on the tolerance ranges.

An object in this case may be understood to mean a feature coded in the training input variable, which may be decoded by the deep neural network and may be utilized to detect the object in the training input variable.

It is particularly advantageous if the penalization variable characterizes a deviation of a posterior distribution function of one of the weights from a prior distribution function of the predefinable discrete values of this weight. In this case, the prior distribution function may be an assumed distribution function of the predefinable discrete values of one weight or of all weights before the training variable has been seen. A distribution function may, for example, characterize the probability of occurrence distribution of the respective possible values of one of the weights. The posterior distribution function in this case indicates the distribution of the values of one of the weights and may, in particular, initially, be arbitrarily selected, since this function is adapted during the training of the deep neural network. The exact form of the posterior distribution function arises after the training using the training variable.

It is also particularly advantageous if the prior distribution function is selected for a predefinable subset of the weights of the neural network as a function of a topology of a part of the deep neural network associated with this predefinable subset. The associated part of the deep neural network are those layers and connections to which the weights from the subset are assigned. This yields the advantage that if multiple weights are able to be combined to form a filter, these weights may be assigned the same prior distribution function. From already known created deep neural functions, it is possible to reuse a piece of information about the distribution of the weight values. From this, it is possible, for example, to derive prior distribution functions, which are assigned to the filters, as a result of which filters may be more simply and more rapidly taught and the training may be carried out in a more targeted manner. A further advantage is that by using the same prior distribution function for the subset, it is possible to more effectively remove redundant filters or weights, since these filters or weights may have a similar discrete value after the training based on the same prior distribution function.

It is further particularly advantageous if the penalization function characterizes a weighted summation of ascertained deviations. One deviation each of the posterior distribution function of one of the weights relative to the prior distribution function is ascertained at one position each, which in each case is assigned one of the predefinable discrete values, and this deviation is weighted based on a weighting function, which is assigned to this respective predefinable discrete value.

Assigned may, in particular, mean that the weighting function is centered around this respective predefinable discrete value. For example, the weighting function, in particular, a Gaussian curve, may be centered symmetrically around the respective predefinable discrete value. In this way, the deviation of the prior distribution function relative to the posterior distribution function may be ascertained piece by piece and the ascertained deviations may subsequently be suitably weighted and superposed, as a result of which the deviation of the two distribution functions is reliably approximated.

It is advantageous if each of the ascertained deviations is an ascertained deviation of the posterior distribution function relative to a log uniform distribution function and this ascertained deviation is shifted to one of the positions respectively of one of the at least two predefinable discrete values and is weighted on the basis of the weighting function assigned to this respective predefinable discrete value.

It is equally advantageous if one of the ascertained deviations is weighted on the basis of a predefinable value, in particular, the value "1" less the sum of the respective weighting function. This has the advantage that a reliable approximation may be carried out for the ascertained deviations even when far removed from the ascertained deviations of the other predefinable discrete values.

It is further advantageous if a deviation of the posterior distribution function from the prior distribution function is ascertained on the basis of an approximation of a Kullback-Leibler divergence between the posterior distribution function and the prior distribution function.

In a further specific embodiment of the method, one of the posterior distribution functions may be adapted as a function of the cost function during the training of the deep neural network, the weight, which is characterized by the adapted posterior distribution function being adapted as a function of the adapted posterior distribution function.

In a further specific embodiment of the method, at least one of the at least two predefinable discrete values may also be the value "0". It is advantageous if the weights, which have been mapped onto the discrete value "0" after the training of the deep neural network, are removed. This has the advantage that after the training of the deep neural network, these weights may be removed without adversely affecting the efficiency of the deep neural network and thus an additional compression of the deep neural network, but also an additional reduction of the computing time and of the required memory space may be achieved.

It is advantageous if the posterior distribution functions are each characterized on the basis of a normal distribution.

It is further advantageous if the sequence of the steps of ascertaining the variable characterizing the cost function and of the training of the deep neural network is repeated multiple times until an abort criterion is met. The abort criterion may, for example, be a predefinable number of repetitions of the sequence of the steps. It may optionally also be defined as an abort criterion that the variable characterizing the cost function must be smaller than a predefinable variable and/or the weights have each assumed a value of the at least two predefinable discrete values or are located within a predefinable range around one of the at least two predefinable discrete values.

It is also advantageous if every layer includes one threshold value each, the penalization variable also characterizing a deviation of a threshold value from at least additional, at least two, predefinable discrete values, one of the threshold values being adapted during the training of the deep neural network as a function of the variable characterizing the cost function. A threshold value is understood to be a value that characterizes a transmission function of the neurons of this layer. The transmission function ascertains an output variable as a function of an input variable and of a predefinable function. The aforementioned different specific embodiment of the method in this case may also be used for adapting the threshold values of the layers to discrete threshold values when creating the deep neural network. For this purpose, only the word "weight" of all aforementioned method steps need be replaced with the word "threshold value."

In one advantageous refinement of the example method, an input variable of the deep neural network is ascertained after the training of the deep neural network. An object is then detected with the aid of the trained deep neural network as a function of the ascertained input variable and subsequently an at least semiautonomous machine is advantageously activated as a function of the detected object. An at least semiautonomous machine may, for example, be a robot, in particular, a vehicle. It is also possible that the method may be used in order to create deep neural networks, which may be operated on a mobile processing unit. A mobile processing unit, in particular, mobile telephones or cameras are characterized by limited memory space, limited computing power and limited power supply. In addition to object detection, the deep neural network may alternatively be trained and/or used for classification, semantic segmentation or regression.

In a further aspect, the present invention provides an example computer program including instructions which, when executed on a computer, effectuate that one of the aforementioned methods is carried out, and a machine-readable memory element, on which the computer program is stored.

In a further aspect, the present invention provides an example device, which is configured to carry out each step of one of the methods.

Exemplary embodiments of the present invention are depicted in the figures and are explained in greater detail below.

DETAILED DESCRIPTION OF EXAMPLE EMBODIMENTS

Figure 1:
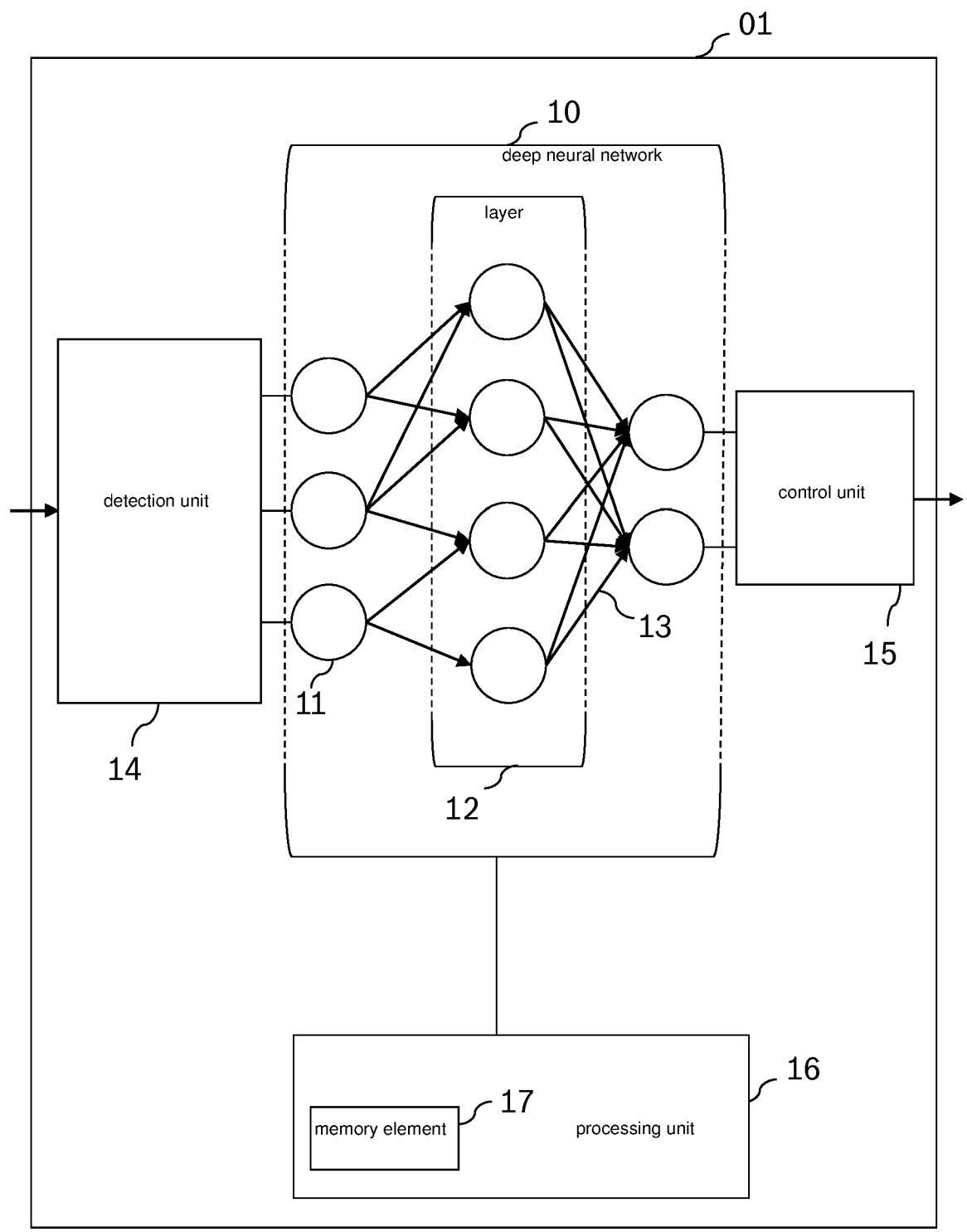
FIG. 1 schematically shows a representation of a system including a deep neural network for detecting an object.

FIG. 1 schematically shows a representation of one specific embodiment of a system 01 for detecting an object and for activating an at least semiautonomous machine as a function of the detected object. System 01 includes a plurality of components 14, 10, 15 connected to one another in series. Component 14 is a detection unit, which detects an input variable for deep neural network 10 and provides the input variable to deep neural network 10. The output of deep neural network 10 is connected to a control unit 15. Control unit 15 is configured to ascertain a control variable as a function of the output variable of deep neural network 10, in order to thereby control, for example, a robot, in particular, a vehicle. In addition, system 01 includes a processing unit 16, which includes a memory element 17. Processing unit 16 may be connected to deep neural network 10.

Deep neural network 10 is made up of a plurality of layers 12, each of which includes a plurality of neurons 11. Neurons 11 each have at least one input and one output. The neuron ascertains an output variable as a function of a transmission function, in particular, of a parameterizable ReLu function or of a sigmoid function, and of the input variable of neuron 11. The neurons of a predefined layer 12 are connected with the aid of connections 13 to the neurons of a subsequent layer. For example, the outputs of each of the neurons of predefinable layer 12 may be connected to all inputs of neurons 11 of the immediately following layer, as this is schematically depicted in FIG. 1 in the right portion of deep neural network 10 and is referred to below as a fully interconnected layer. It is also possible, however, that not every output of a neuron of a layer is connected to every input of a neuron of a following layer, as is depicted in the left portion of deep neural network 10. It is equally possible that the output of a neuron is connected to an input of a neuron of a layer (for example, a "shortcut connection/skip connection") not immediately following, or to a preceding layer. It should be noted that this is not depicted in FIG. 1.

Each connection 13 is assigned a weight. The output variable of a neuron is weighted with the aid of this weight and is provided as an input variable for the following neuron. Each weight preferably has a value between including −1 and 1 and the output variable of the neuron is weighted by a multiplication by this weight and may then be used as an input variable of the neuron connected with connection 13.

Figure 2A:
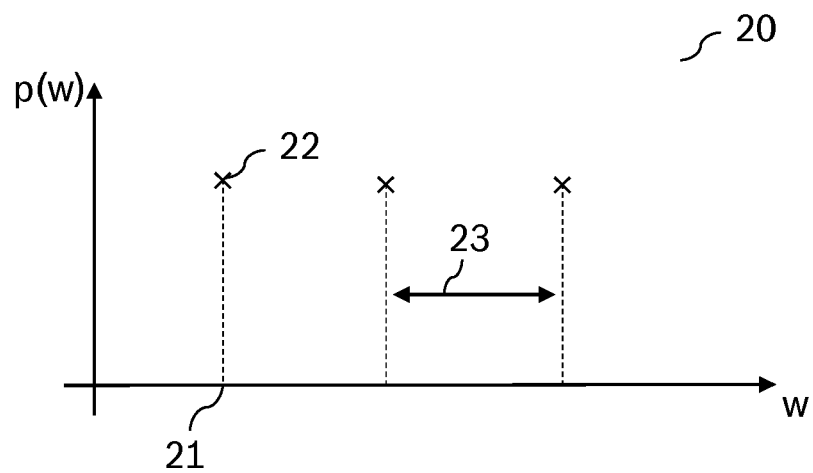
FIG. 2A schematically shows a representation of a prior distribution function, which characterizes a plurality of predefinable discrete values.

FIG. 2A schematically shows a representation of a possible prior distribution function 20, which describes the probability of occurrence p(w) of the predefinable discrete values w 21. Prior distribution function 20 is a distribution function, which describes an assumption made about the distribution of the weight values. The assumption may, for example, be that the values w of a weight are only discrete and equally distributed. As shown in FIG. 2A, it is assumed here that the weight may assume only 3 different discrete values 21 and that a probability of occurrence 22 is assigned to each of these. In one alternative specific embodiment, two or more than three different discrete values 21 may also be described by the prior distribution function 20. It is advantageous if a predefinable discrete value 21 is equal to "0", which enables a simple removal of redundant weights. A weight that assumes the value "0" is redundant in this case, since the information of the input variable is lost by a multiplication by "0". A step width 23, i.e., a distance between two predefinable discrete values may be selected to be arbitrarily large. Step width 23, however, is preferably proportional to a number of the used bits for representing the predefinable discrete values in processing unit 16.

Priori distribution function 20 may be used below for the purpose of training deep neural network 10, so that the values of the weights assume, in particular, exclusively one of the predefined discrete values.

Prior distribution function 20 is selected in the exemplary embodiment by way of example as follows:

$$p(w) \approx \sum_{k=1}^{n} \frac{1/n}{|w - c_k|}$$  (Equation 1)

n corresponding to a number of predefinable discrete values, w being the value of the weight and $c_k$ in each case being the nth predefinable discrete value.

Figure 2B:
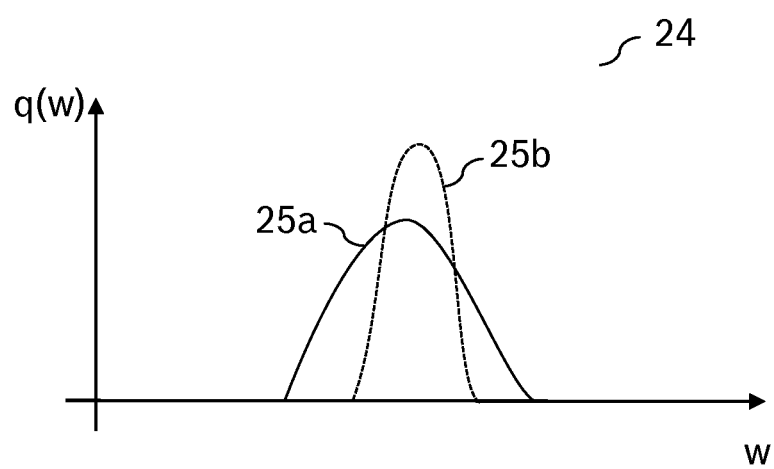
FIG. 2B schematically shows a representation of a posterior distribution function of a weight.

FIG. 2b schematically shows a representation of posterior distribution function 24. Posterior distribution function 24 is preferably a normal distribution and may be initialized, in particular, randomly at the beginning of the method. Posterior distribution function 24 describes the probability of occurrence q(w) of a value w of a weight. During the training of deep neural network 10, posterior distribution function 24 may be adapted so that the function approximates a suitable value w of the weight for the training variable used. A suitable value w of a weight is characterized in that deep neural network 10 reliably solves the predefined task, in particular, of detecting an object in the input variable of deep neural network 10 on the basis of the suitable value w of the weight. FIG. 2B show posterior distribution function 25a initialized by way of example, which is adapted during the training of deep neural network 10. This adapted posterior distribution function 25b then describes the probability of occurrence q(w) of the value of the weight once a training variable has been used for training deep neural network 10.

Figure 3:
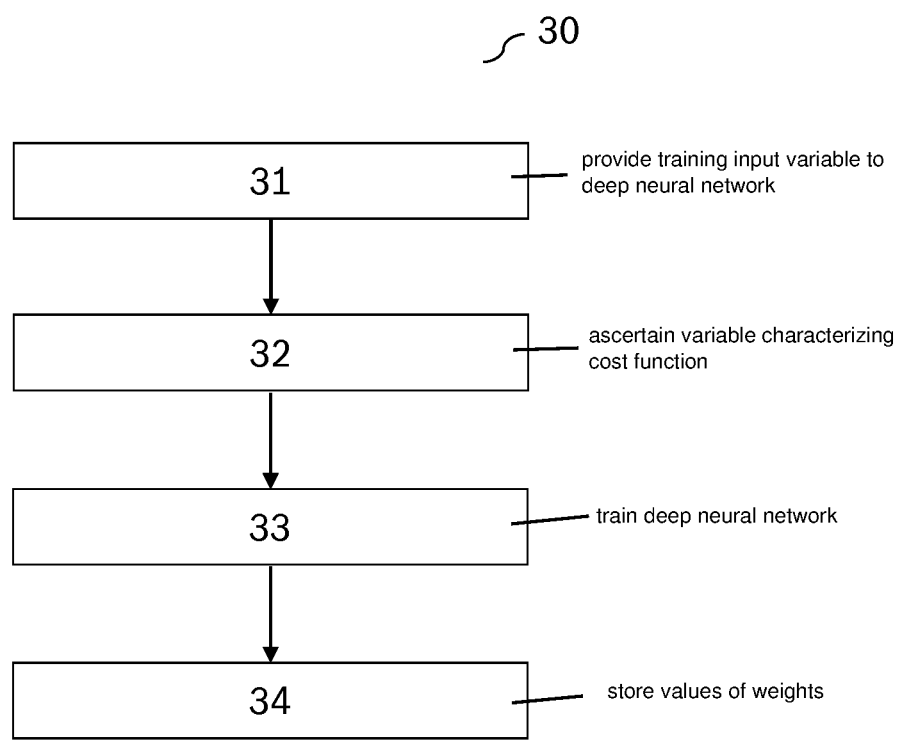
FIG. 3 schematically shows a representation of one specific embodiment of the example method according to the present invention.

FIG. 3 schematically shows a representation of a flow chart of one specific embodiment of method 30 for creating a deep neural network, in which the weights exhibit a value of a predefinable list of predefinable discrete values after the deep neural network is created.

Method 30 begins with step 31. In step 31, a training input variable is provided to deep neural network 10. Once the training variable has been provided, posterior distribution function 24 of the weights may optionally be initialized, in particular, randomly. Prior distribution function 20 may also be posited in step 31. Each weight of deep neural network 10 is preferably assigned one prior distribution function 20 and one posterior distribution function 24 each. The positing of prior distribution function 20 may be carried out, for example, in that the distribution of values of the weights may be detected from previously trained deep neural networks, for example, for similar areas of application, in order to derive therefrom prior distribution function 20. The derivation of prior distribution function 20 may, for example, be carried out with the aid of a cluster analysis of the weight values and of an observation of the frequency of occurrence of the different weight values. The ascertained cluster centers may be utilized after the cluster analysis as predefinable discrete values, and these clusters may each be assigned a probability of occurrence based on the observation of the frequency of occurrence of the respective values, which may be characterized, for example by the prior distribution function. Alternatively, prior distribution function 20 may be established on the basis of a list including predefinable discrete values 21 and their, in particular, assumed or estimated probability of occurrence p(w). Alternatively, prior distribution function 20 may, for example, be selected as shown above in (equation 1), or may be selected as a log uniform distribution function. Prior distribution function 20 may either be used for each weight of deep neural network 10, or multiple different prior distribution functions 20 may be used for one selected subset each of the weights of deep neural network 10.

Step 32 follows, once step 31 has been completed. In step 32, a first variable of a cost function is ascertained as a function of the weights and of the ascertained output variable of deep neural network 10 and of a predefinable setpoint output variable of deep neural network 10.

Since the weights in this exemplary embodiment of the method are described on the basis of distribution functions, it is possible, for example, to ascertain the first variable using a cross entropy error function $L_{D,1}$:

$$L_{D,1} = \Sigma_D \mathbb{E}_{q(w)}[\log(p(y|x,w))] \quad \text{(Equation 2)}$$

D including the training variable, $\mathbb{E}_{q(w)}[\bullet]$ representing the expected value operator applied to q(w) and the conditioned probability p(y|x,w) that with the values w of the weights, the input data x of training variable D, a correct setpoint output variable y has been ascertained.

In addition, a penalization variable to the first variable of the cost function is ascertained in step 32. The penalization variable in this case characterizes a deviation of a value of one of the weights from at least one of the predefinable discrete values. Since the weights in this exemplary embodiment are described on the basis of distribution functions, it is possible to ascertain the penalization variable preferably with the aid of a Kullback-Leibler (KL) divergence. This may, for example, be represented with the following formula:

$$L_{D,KL} = -DL(q(W) \| p(W)) \quad \text{(Equation 3)}$$

$DL(q(w) \| p(w))$ being the KL divergence between posterior distribution function q(w) and prior distribution function q(w).

It is also possible that the penalization variable is determined by another mathematical operation such as, for example, by a mathematical distance measure (such as, among others, a Euclidean distance) a deviation of the values of the weights relative to predefinable discrete values and/or multiple, primarily different penalization variables are ascertained.

As a function of the selection of prior distribution function 20, the penalization variable has no analytically concluded solution, though this may be approximated.

If prior distribution function 20 has the structure according to (equation 1) and the deviation between the two distribution functions is to be ascertained, it is possible, for example, to suitably approximate the KL divergence in order to ascertain the deviation. The approximation of the KL divergence according to (equation 3) with posterior distribution function p(w) according to (equation 1) may be carried out with the following steps.

A deviation of posterior distribution function 24 relative to a log uniform distribution function may be initially ascertained, for example, with a KL divergence between these two distribution functions. The log uniform distribution function may be used, since methods such as, for example, a Monte Carlo sampling, are conventional regarding the deviation of the log uniform distribution function relative to posterior distribution function 24. The ascertained deviation may subsequently be shifted to the position of the respective discrete values. These shifted deviations each represent in this case a deviation ascertained piece by piece of the entire deviation of prior distribution function 20 relative to posterior distribution function 24. Each shifted deviation is subsequently weighted with the aid of a weighting function, in particular, of a Gaussian function, which is centered around the position of the predefinable discrete value. The individual deviations, once they are weighted with the respective weighting function, are totaled according to a predefinable weighting. The expected value of posterior distribution function 24 is preferably selected for the predefinable weighting. This weighted summation of the individual deviations corresponds to an approximated KL divergence of prior distribution function 20 and of posterior distribution function 24 according to (equation 3).

In order to carry out the approximation of the KL divergence with a higher degree of accuracy, one of the weighting functions of an ascertained KL divergence may, for example, be selected elsewhere. This weighting function preferably has the structure that the sum of the weighting function used is subtracted from a predefinable value, in particular, "1".

Once the KL divergence has been ascertained, a summation of the first variable according to (equation 2) and of penalization variable according to (equation 3) is carried out. This summation then represents a variable characterizing the cost function. However, it is also possible that the first variable according to (equation 2) and the penalization variable according to (equation 3) may be linked to one another by other mathematical operations. When multiple penalization variables have been ascertained, it is possible to also consider these in the variable characterizing the cost function.

When step 32 with the ascertainment of the variable characterizing the cost function has been completed, step 33 follows. In step 33, deep neural network 10 is trained. During the training of deep neural network 10, the values of the weights are ascertained so that deep neural network 10 is able to detect, for example, objects in the input variable of deep neural network 10. In the process, the values of the weights are adapted as a function of the variables that characterize the cost function, so that deep neural network 10 is able to detect objects. A change variable of the weights is preferably ascertained using an optimization method, in particular, a gradient descent method, so that after taking into account the change variable in at least a plurality of weights, the variable characterizing the cost function is minimized. It is also possible that the posterior distribution function is adapted as a function of the variable characterizing the cost function, and the values of the weights are adapted as a function of adapted posterior distribution function 24, in particular, by using the expected value of posterior distribution function 24 as the adapted value of the weight. If posterior distribution function 24 is a normal distribution, it is possible to adapt the expected value and the standard deviation of the normal distribution as a function of the ascertained change variable. By adapting the expected value and the standard deviation of the normal distribution, the adaptation may, after the training variable is used for training deep neural network 10, describe the probabilities of occurrence of suitable values of this weight.

Step 34 is initiated after step 33. In step 34, the values of the weights are stored. If the value of one of the weights has a value similar to a predefinable discrete value from the list of discrete values, the discrete value from the list of discrete values is stored as the value of this weight. Similar is understood to mean that if the value of one of the weights is closer to one of two predefinable discrete values, the value of this weight is similar to the closer discrete value. If the value of one of the weights has only one predefinable discrete value as the next closest value, this value may be similar to this predefinable discrete value.

The discrete value of the weight is stored preferably in the form of an index of the discrete value, each predefinable discrete value from the list of discrete values being assigned an index. In this way, it is possible to carry out the storing of the value of this weight by storing the index. Thus, only the list including discrete values need be stored with a high degree of accuracy, whereas the values of the weight in the form of an index may be stored with minimal storage effort.

In a further exemplary embodiment of method 30, it is possible that a subsequent step is initiated after the completion of step 34. In this subsequent step, an input variable may be provided to deep neural network 10 with the aid of detection unit 14. An output variable is subsequently ascertained in this step with the aid of deep neural network 10 as a function of the provided input variables and the weights. This output variable may be used by control unit 15 in order to ascertain a control variable. With this control variable, it is possible, for example, to activate a robot, in particular, a vehicle.

Once method 30 has been completed with step 34, method 30 may be initiated cyclically again in a further exemplary embodiment with one of steps 31, 32 or step 33. Alternatively, the sequence of steps 31, 32, 33 may also be carried out cyclically until a predefinable abort criterion is met. Step 34 may subsequently be carried out.

In a further alternative specific embodiment of method 30, the initialization of posterior distribution function 24 may alternatively be carried out on the basis of a previously created deep neural network. For example, the distribution of the values of the weights of the previously created deep neural network may be used in order derive therefrom at least one suitable posterior distribution function of one of the weights. This has the advantageous effect that during the, in particular, renewed training of the, in particular, previously created deep neural network using this posterior distribution function, a compressed deep neural network may be present after the aforementioned steps of method 30 are carried out.

Figure 4:
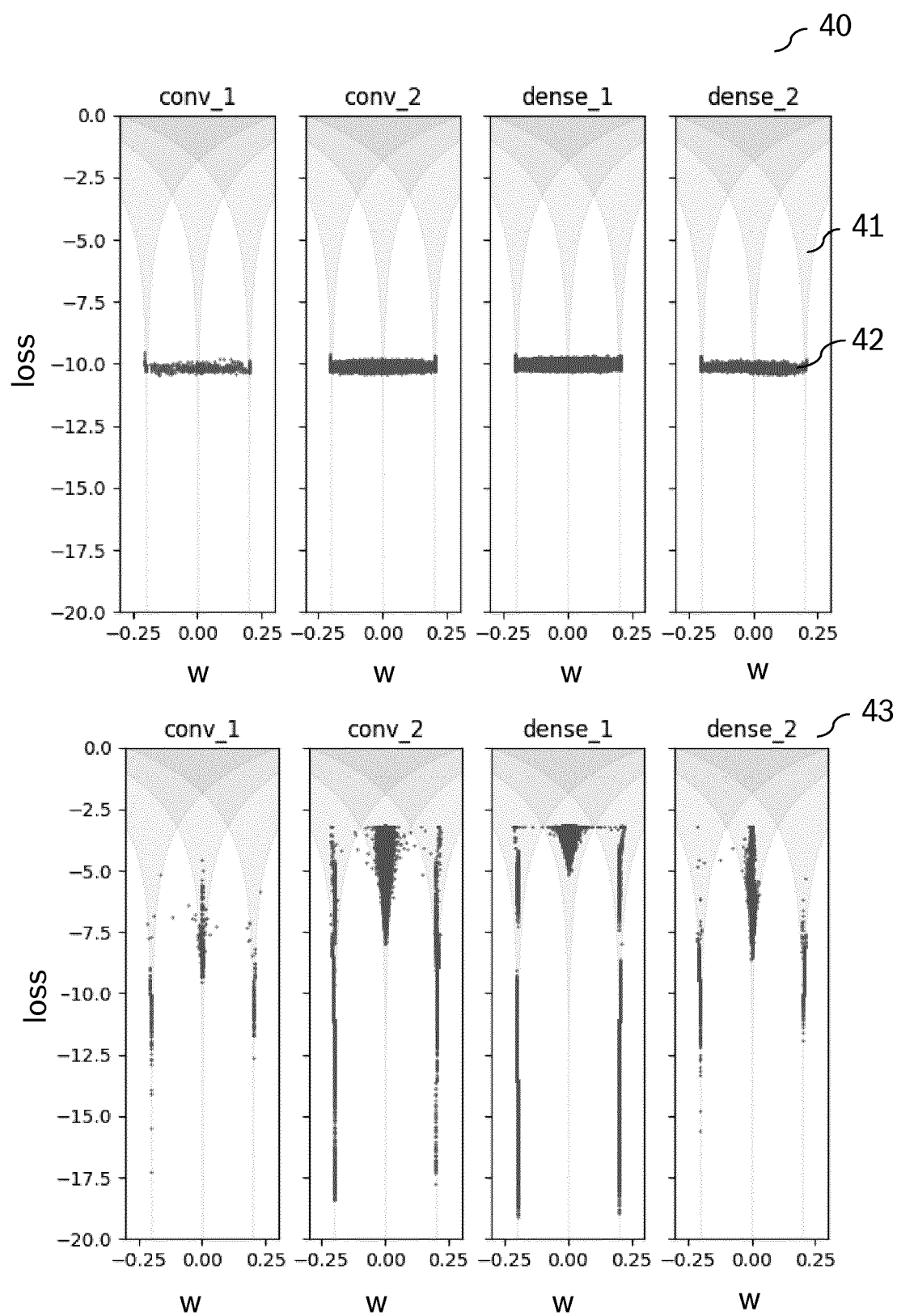
FIG. 4 schematically shows the distribution and temporal development of the values of the weights during the training of a deep neural network used by way of example, including two fully interconnected layers and two convolutional layers.

FIG. 4 schematically shows a representation of a distribution and of a temporal development of the values of all weights when using the method of the exemplary embodiment for creating a deep neural network that includes four layers. Two of the layers are fully interconnected layers (dense_1, dense_2) and the remaining layers are convolution layers (conv_1, conv_2). Upper four diagrams 40 in this case show in each case value w of the weights of the respective layer on the x-axis and the penalization variable is entered on the y-axis, referred to as "loss" in FIG. 4. The "loss" in this case indicates a value of the penalization variable as a function of value w of the weight. The profile of a KL divergence 41 ascertained piece by piece and weighted using a weighting function according to step 32 is represented in gray in each case for each of the three predefinable discrete values (−0.2, 0, 0.2). The further removed the value of the weight is from a predefinable discrete value (−0.2, 0, 0.2) the greater the value of the penalization variable becomes. A possible profile of the penalization variable is also plotted in gray along value w of the weights in diagrams 40, 43 via the weighted superposition of shifted KL divergences 41. The individual values of the weights are each entered by points 42 in upper four diagrams 40. Since these diagrams have been recorded after the initialization of deep neural network 10, and the deep neural network has been randomly initialized, the value of the weights are randomly distributed. Once the method has been carried out, lower four diagrams 43 have been recorded. As depicted in FIG. 4, lower four diagrams 43 show that the values of the weights assume the predefinable discrete values (−0.2, 0, 0.2).

What is claimed is:

1. A method for creating a deep neural network, the deep neural network including a plurality of layers and connections having weights, and the weights in the created deep neural network being able to assume only predefinable discrete values from a predefinable list of discrete values, the method comprising the following steps:
   providing at least one training input variable for the deep neural network;
   ascertaining a variable characterizing a cost function, the variable characterizing the cost function including a first variable, which characterizes a deviation of an output variable of the deep neural network ascertained as a function of the provided training input variable relative to a predefinable setpoint output variable, and the variable characterizing the cost function further including at least one penalization variable which characterizes a deviation of a value of one of the weights from at least one of at least two of the predefinable discrete values;
   training the deep neural network to detect an object as a function of the training input variable of the deep neural network, at least one value of one of the weights being adapted during the training of the deep neural network as a function of the variable characterizing the cost function; and
   mapping values of the weights on respective discrete values contained in the predefinable list.

2. The method as recited in claim 1, wherein the penalization variable characterizes a deviation of a posterior distribution function of one of the weights from a prior distribution function of the predefinable discrete values of the one of the weights.

3. The method as recited in claim 2, wherein the prior distribution function for a predefinable subset of the weights of the deep neural network is selected as a function of a topology of a part of the deep neural network associated with the predefinable subset.

4. The method as recited in claim 2, wherein the penalization variable characterizes a weighted summation of ascertained deviations, one deviation each of the posterior distribution function of one of the weights relative to the prior distribution function being ascertained at one position each, which is assigned to a respective one each of the predefinable discrete values, and the ascertained deviation being weighted based on respective one of a plurality of weighting functions, which respective one of the weighting functions is assigned to the respective predefinable discrete value.

5. The method as recited in claim 4, wherein the ascertained deviations are, in each case, an ascertained deviation of the posterior distribution function relative to a log uniform distribution function, the ascertained deviation being shifted to one of a plurality of positions that are, respectively, of respective ones of the at least two predefinable discrete values and being weighted based on the respective one of the weighting functions that is assigned to the respective predefinable discrete value.

6. The method as recited in claim 4, wherein one of the ascertained deviations is weighted based on a predefinable value less a sum of the plurality of weighting functions.

7. The method as recited in claim 2, wherein the deviation of the posterior distribution function from the prior distribution function is ascertained based on an approximation of a Kullback-Leibler divergence between the posterior distribution function and the prior distribution function.

8. The method as recited in claim 2, wherein during the training of the deep neural network, the posterior distribution functions is adapted as a function of the cost function to form an adapted posterior function, the weights, which are characterized by the adapted posterior distribution function, being adapted as a function of the adapted posterior distribution function.

9. The method as recited in claim 1, wherein one of the at least two of the predefinable discrete values is a value of "0".

10. The method as recited in claim 1, further comprising the following steps:
    after the training of the deep neural network, ascertaining an input variable of the deep neural network; and
    detecting an object using the trained deep neural network as a function of the ascertained input variable.

11. The method as recited in claim 10, further comprising the following step:
    activating an at least semiautonomous machine as a function of the object that has been detected in the detecting step.

12. The method as recited in claim 1, wherein:
    the mapping:
        maps each one of all values of the weights on a respective one of the discrete values contained in the predefinable list; and
        is performed by:
            associating in a memory each of the discrete values contained in the predefinable list with a unique index; and
            assigning to each of a plurality of neuron inputs of the deep neural network one of the unique indexes in place of a respective one of the values of the weights; and
    the deep neural network being configured to weigh the neuron inputs with respective ones of the discrete values contained in the predefinable list according to the assigned unique indexes.

13. A non-transitory machine-readable memory element on which is stored a computer program for creating a deep neural network, the deep neural network including a plurality of layers and connections having weights, and the weights in the created deep neural network being able to assume only predefinable discrete values from a predefinable list of discrete values, the computer program, when executed by a computer, causing the computer to perform the following steps:
    providing at least one training input variable for the deep neural network;
    ascertaining a variable characterizing a cost function, the variable characterizing the cost function including a first variable, which characterizes a deviation of an output variable of the deep neural network ascertained as a function of the provided training input variable relative to a predefinable setpoint output variable, and the variable characterizing the cost function further including at least one penalization variable which characterizes a deviation of a value of one of the weights from at least one of at least two of the predefinable discrete values;
    training the deep neural network to detect an object as a function of the training input variable of the deep neural network, at least one value of one of the weights being adapted during the training of the deep neural network as a function of the variable characterizing the cost function; and
    mapping values of the weights on respective discrete values contained in the predefinable list.

14. A device configured to create a deep neural network, the deep neural network including a plurality of layers and connections having weights, and the weights in the created deep neural network being able to assume only predefinable discrete values from a predefinable list of discrete values, the device comprising a processor, wherein the processor is programmed, by which programming of the processor, the processor is configured to:
    provide at least one training input variable for the deep neural network;
    ascertain a variable characterizing a cost function, the variable characterizing the cost function including a first variable, which characterizes a deviation of an output variable of the deep neural network ascertained as a function of the provided training input variable relative to a predefinable setpoint output variable, and the variable characterizing the cost function further including at least one penalization variable which characterizes a deviation of a value of one of the weights from at least one of at least two of the predefinable discrete values;
    train the deep neural network to detect an object as a function of the training input variable of the deep neural network, at least one value of one of the weights being adapted during the training of the deep neural network as a function of the variable characterizing the cost function; and
    map values of the weights on respective discrete values contained in the predefinable list.

* * * * *